US009953155B2

(12) United States Patent
Robert et al.

(10) Patent No.: US 9,953,155 B2
(45) Date of Patent: Apr. 24, 2018

(54) SYSTEM AND METHOD FOR COORDINATING ASSET ENTITLEMENTS

(75) Inventors: Arnaud Robert, Simi Valley, CA (US); Edward C. Drake, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1008 days.

(21) Appl. No.: 12/928,351

(22) Filed: Dec. 8, 2010

(65) Prior Publication Data

US 2012/0150843 A1 Jun. 14, 2012

(51) Int. Cl.
*G06F 21/41* (2013.01)
*G06F 21/62* (2013.01)

(52) U.S. Cl.
CPC .......... *G06F 21/41* (2013.01); *G06F 21/6236* (2013.01)

(58) Field of Classification Search
USPC ................................. 707/722, 769; 726/4, 28
See application file for complete search history.

(56) References Cited

U.S. PATENT DOCUMENTS

| 7,152,108 | B1 * | 12/2006 | Khan ...................... G06F 21/62 709/225 |
| 2004/0128390 | A1 * | 7/2004 | Blakley, III .......... H04L 63/104 709/228 |
| 2007/0289028 | A1 * | 12/2007 | Vaughan ............... G06F 21/105 726/30 |
| 2008/0028208 | A1 * | 1/2008 | Bolcer .................... G06F 21/10 713/156 |
| 2008/0086770 | A1 * | 4/2008 | Kulkarni ............. H04L 63/0876 726/20 |
| 2009/0012934 | A1 * | 1/2009 | Yerigan ................. G06F 21/105 |
| 2009/0119763 | A1 * | 5/2009 | Park .................... H04L 63/0815 726/8 |

(Continued)

FOREIGN PATENT DOCUMENTS

| JP | 2007-220095 | 8/2007 |
| JP | 2010-198228 | 9/2010 |
| WO | 03/049000 | 6/2003 |
| WO | WO 2003/049000 | 6/2003 |

OTHER PUBLICATIONS

Wikipedia, "OpenID", Internet Citation, (Jan. 6, 2010), pp. 1-11, XP-002629428, Retrieved from the Internet: URL:http://en.wikipedia.org/w/index.php?title=OpenID&oldid=336187855.

(Continued)

*Primary Examiner* — Tsan-Yu J Huang
(74) *Attorney, Agent, or Firm* — Farjami & Farjami LLP

(57) ABSTRACT

There is presented a system and method for coordinating asset entitlements, the system comprising a server including a processor and a memory and accessible by multiple domains over a network, and an asset entitlement database searchable by the server, wherein an entry of the asset entitlement database links a domain transcendent user identification (ID) of a user and at least one asset entitlement acquired by the user from any of the domains. In one embodiment, the server is configured to receive an asset entitlement inquiry from one of the domains, search the asset entitlement database for asset entitlements acquired by the user from any of the domains, generate a search result identifying the asset entitlements acquired by the user from the domains, and send data corresponding to the search result to the domain from which the asset entitlement inquiry was received.

28 Claims, 3 Drawing Sheets

(56) References Cited

U.S. PATENT DOCUMENTS

| | | | | |
|---|---|---|---|---|
| 2009/0287583 | A1* | 11/2009 | Holmes | G06F 17/30861 705/26.1 |
| 2010/0306485 | A1* | 12/2010 | Dubhashi | G06F 21/10 711/162 |
| 2011/0088087 | A1* | 4/2011 | Kalbratt | 726/7 |
| 2012/0150843 | A1* | 6/2012 | Robert | G06F 21/6236 707/722 |

OTHER PUBLICATIONS

Openid.Net: "OpenID Authentication 2.0—Final", (Dec. 5, 2007), pp. 1-34, XP-55017217, Retrieved from the Internet: <URL:http://openid.net/specs/openid-authentication-2_0.html#http_encoding>.

Wikipedia: "OpenID", Internet Citation, Jan. 6, 2010 (Jan. 6, 2010), pp. 1-11. XP002629428, Retrieved from the Internet: URL:http://en.wikipedia.org/w/index,php?title=OpenID&oldid=336187855 [retrieved on Mar. 21, 2011].

Openid.Net: "OpenID Authentication 2.0—Final", Dec. 5, 2007 (Dec. 5, 2007), pp. 1-34, XP055017217, Retrieved from the Internet: URL:http://openid.net/specs/openid-authentication-2_0.html#http_encoding [retrieved on Jan. 23, 2012].

"OpenID." *Wikipedia, The Free Encyclopedia*. Wikimedia Foundation, Inc. Web. Mar. 21, 2011. https://en.wikipedia.org/w/index.php?title=openid&oldid=336187855. pp. 1-12.

"OpenID Authentication 2.0—Final." Openid.Net. Web. Jan. 23, 2012. http://openid.net/specs/openid-authentication-2_0.html#http_encoding. pp. 1-36.

\* cited by examiner

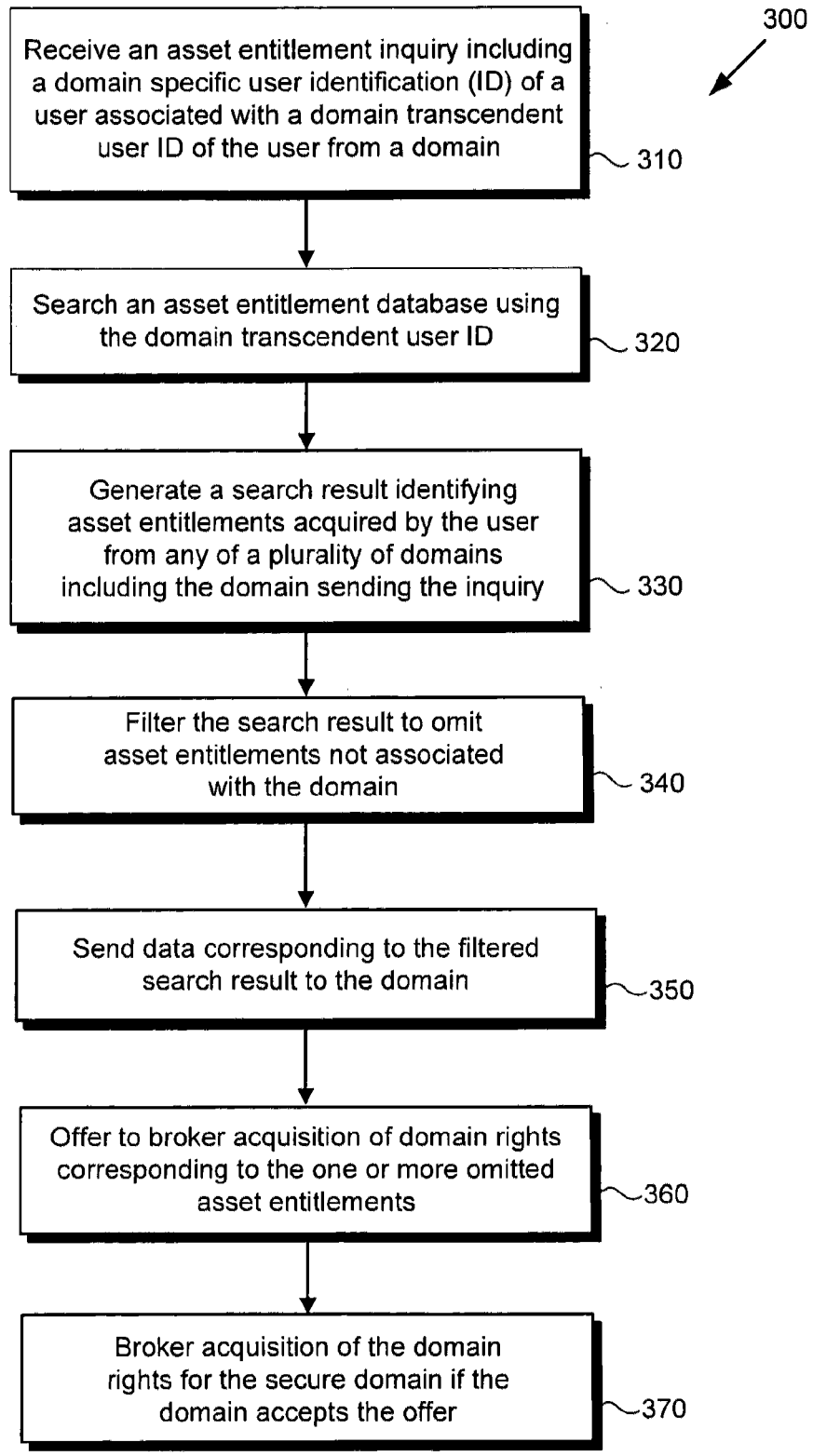

SYSTEM AND METHOD FOR COORDINATING ASSET ENTITLEMENTS

BACKGROUND OF THE INVENTION

1. Field of the Invention

The present invention relates generally to managing user rights across a communications network. More particularly, the present invention relates to systems and methods enabling coordination of asset entitlements acquired by a user across multiple domains or distribution channels.

2. Background Art

Consumers are increasingly turning to online providers when shopping for goods and services. In an effort to protect the personal and financial information required to complete an online transaction, providers of goods and services typically provide a secure network domain and require that the consumer participate in creating a user identity specific to the provider and their secure network domain. This user identity may consist of potentially sensitive personally identifiable information such as an address, telephone number, credit card information, email address, and the like. In addition, the consumer may be required to create log-in credentials such as a username and password to authenticate their identity to the provider when engaging in a transaction using the secure domain.

In a conventional approach to managing a user identity within a secure provider domain, the potentially sensitive consumer information and consumer credentials are relationally linked together by the provider in the form of a unique provider defined consumer identification (consumer ID). Across a network, such as the Internet, for example, a consumer may have a unique user identity and related unique provider generated consumer ID that is domain specific and associates them only to the secure domain of the respective provider, for each provider with which the consumer interacts.

There may be many circumstances, however, in which an exchange of consumer transaction information among secure provider domains can provide advantages to consumers and providers alike. For example, the exchange of consumer transaction information across multiple secure providers can enable delivery of product and/or service availability information to a consumer that is more likely to be responsive to his or her tastes and preferences. As a result, a consumer may gain more transparent access to products and/or services of genuine interest, while being more effectively screened from advertising material focused on products and services likely to be less desirable. Unfortunately, as the result of conventional approaches to ensuring the security of individual online transactions, should a provider wish to share transaction information for a given consumer with one or more other providers, they may be unable to do so without also sharing consumer credentials or other potentially sensitive or personally identifiable information about the consumer.

Accordingly, there is a need to overcome the drawbacks and deficiencies in the art by providing a solution for managing and coordinating the distribution of consumer transaction information across provider domains that enables the sharing of information about consumer asset acquisitions while protecting sensitive financial and other personally identifiable consumer information.

SUMMARY OF THE INVENTION

There are provided systems and methods for coordinating asset entitlements, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 is a flowchart presenting a method for coordinating asset entitlements, according to one embodiment of the present invention.

DETAILED DESCRIPTION OF THE INVENTION

Figure 1:
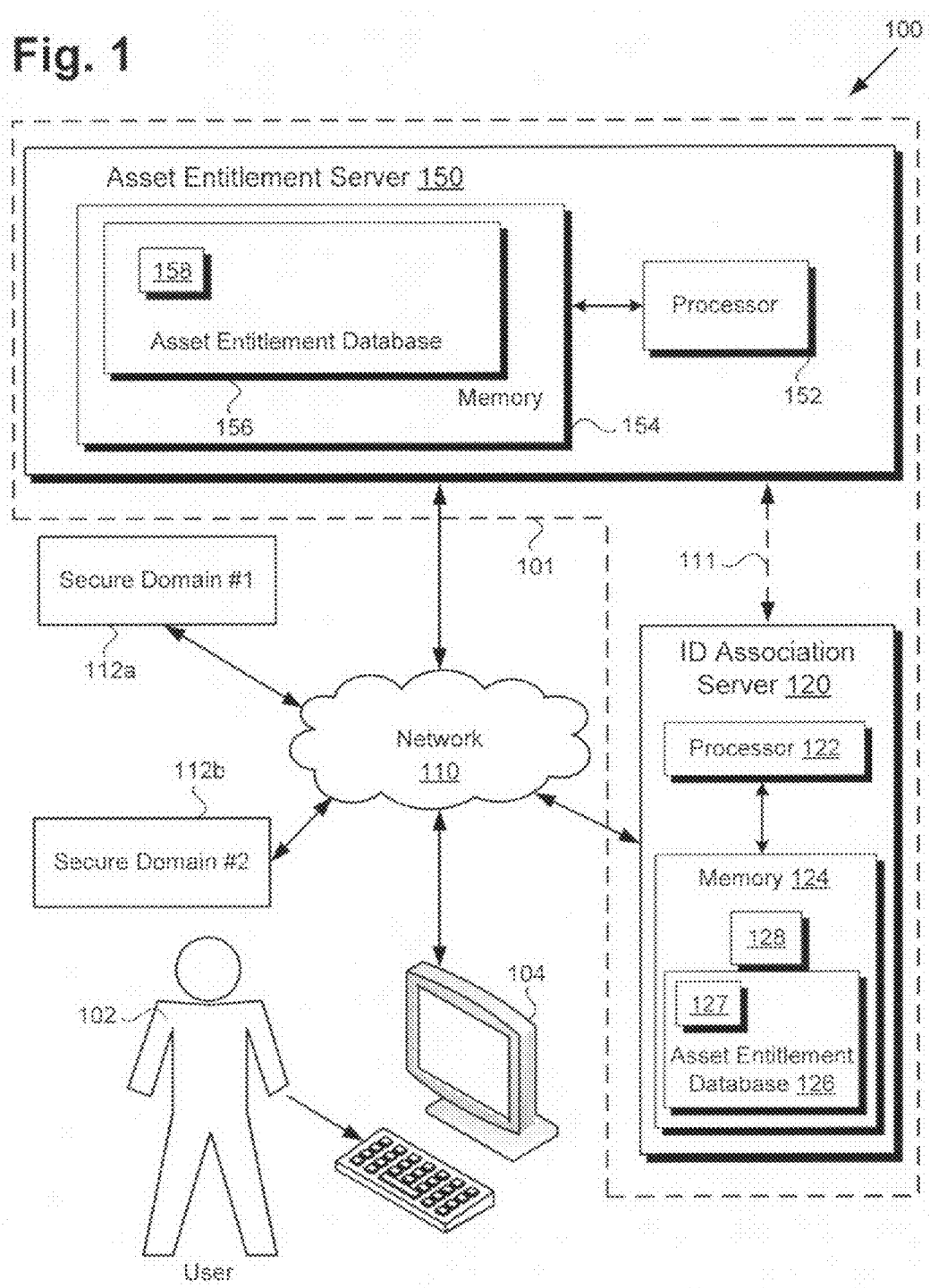
FIG. 1 shows a block diagram of a system for coordinating asset entitlements, according to one embodiment of the present invention.

The present application is directed to a system and method for coordinating asset entitlements. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a block diagram of system 100 for coordinating asset entitlements, according to one embodiment of the present invention. As a preliminary matter, the present inventors herein define the feature "asset entitlement" to refer to a combination of rights with respect to a particular acquirable asset. For example, such a combination of rights may comprise a user asset right coupled with a user entitlement right, the user asset right comprising the right to enjoy a particular asset by the user and the user entitlement right defining conditions governing enjoyment of the asset by the user. Moreover, and as herein further defined by the inventors, an asset entitlement may correspond to a combination of rights associated with the provider of the asset or a secure network domain of the provider. For instance, an asset entitlement may correspond to the combination of a domain asset right and a domain entitlement right, the domain asset right comprising the right to provide an asset by a secure provider domain and the domain entitlement right defining the conditions governing provision of the asset by the secure provider domain.

As a specific example of the foregoing, set forth in such detail merely for the purposes of conceptual clarity, in one embodiment of the present invention, an asset may comprise a cognizable unit of digital media content, such as digital audio/visual content in the form of a digital move, film clip, or an episode of television programming; digital music content in the form of an album or music single; or digital literary content in the form of an e-book. Moreover, a particular asset may be characterized by its title, an asset class to which it corresponds, such as movies, music, or literature, for example, or an asset feature such as its theme or genre, or a character, performer, or author corresponding to the asset. For instance, an asset corresponding to the second movie in the Pirates of the Caribbean series might be characterized by its class, e.g., movie content, title, e.g., Dead Man's Chest, theme, e.g., pirates, genre, e.g., fantasy/adventure, and/or actor, e.g., Johnny Depp.

According to the present example, an asset entitlement for such an asset may comprise a user right to enjoy use of the unit of digital media content, and the manner and/or duration of that right of enjoyment, for example, through the alternative asset entitlements of licensing or ownership of the digital media content, rental of the digital media content, subscription to the digital media content, or time or use limited right of access to the digital media content over a communications network. Simply put, an asset entitlement may be as simple as a particular user's right to view a particular digital movie over the Internet and may correspond to the right of a particular secure provider domain to offer that type of access to that digital movie.

Returning now to the embodiment of the present invention depicted in FIG. 1, system 100 comprises asset entitlement server 150 including processor 152 and memory 154, and is shown in FIG. 1 to be implemented in combination with identification (ID) association server 120 including processor 122 and memory 124 having stored therein ID associator application 128 and database 126 containing domain transcendent ID record 127. FIG. 1 also shows that, according to the present embodiment, memory 154 of asset entitlement server 150 stores asset entitlement database 156 containing entry 158. As further shown in FIG. 1, asset entitlement server 150 and ID association server 120 are accessible by a plurality of domains, e.g., secure domains 112a and 112b, over network 110, which may be any suitable communications network. For example, in one embodiment, network 110 may comprise a packet network, such as the Internet. Also shown in FIG. 1 are user 102, and client-side computer 104 utilized by user 102 to interact with one or more of secure domains 112a and 112b over network 110. It is noted that although domains 112a and 112b are characterized as secure domains in the embodiment of FIG. 1, as well as in that of FIG. 2 described below, that characterization is provided merely as an example. More generally, secure domains 112a and 112b may correspond to secure domains, unsecured domains, or a combination of both domain types.

The embodiment of FIG. 1 groups asset entitlement server 150 and ID association server 120, as indicated by dashed boundary 101. In addition, FIG. 1 shows asset entitlement server 150 and ID association server 120 to be configurable for communication through network 110, or through dedicated communication link 111. The representation shown in FIG. 1 is intended to convey some of the variety of possible arrangements associating asset entitlement server 150 and ID association server 120. For example, the dashed nature of boundary 101 and dedicated communication link 111 indicate that in their absence in some embodiments, asset entitlement server 150 and ID association server 120 may be independent and/or physically remote from one another, and may communicate through network 110. Alternatively, in other embodiments, asset entitlement server 150 and ID association server 120 may be linked by dedicated communication link 111 and may further be implemented in combination, through being co-located or in close proximity, for example.

According to the embodiment of FIG. 1, asset entitlement server 150 of system 100 is configured to coordinate asset entitlements across a plurality of secure domains, such as secure domains 112a and 112b. For example, asset entitlement server 150 may be configured to receive an asset entitlement inquiry including a domain transcendent user ID of user 102 recognized across secure domains 112a and 112b from one of secure domains 112a or 112b. In response to that entitlement inquiry, asset entitlement server 150 may perform a search of asset entitlement database 156, wherein an entry, such as entry 158, links the domain transcendent user ID of user 102 and one or more asset entitlements acquired by user 102 from either of secure domains 112a and 112b. Asset entitlement server 150 is further configured to generate a search result identifying the asset entitlements acquired by user 102 from secure domains 112a and 112b, and to send data corresponding to the search result to the one of secure domains 112a and 112b from which the entitlement inquiry was received.

In some embodiments, asset entitlement server 150 may be configured to identify the secure domain from which the asset entitlement inquiry is received as authorized to make such a request for information before sending the data in response. In instances in which the secure domain in question is not authorized to make the inquiry and/or receive the data corresponding to the search result, asset entitlement server 150 may be further configured to send a message to the secure domain indicating that the received asset entitlement inquiry is invalid. In addition, in some embodiments, such an invalidity message may include information regarding the steps required of the secure domain in order for the secure domain to acquire authorized status. Alternatively, in some embodiments, asset entitlement server 150 may be configured to accept open asset entitlement inquiries and to provide the data corresponding to the search result to the querying domain without requiring that the domain have first acquired authorized status.

Moreover, in some embodiments, asset entitlement server 150 may also be configured to filter the search result prior to sending the data, based on one or more of several possible filtering criteria. For example, asset entitlement server 150 may be configured to filter the search result by asset class, asset title, or asset feature, as described above, so as to omit identification of asset entitlements not associated with the filtering criteria. As another example, asset entitlement server 150 may be configured to filter the search result according to a code specifying one or more secure domains, in order to limit the data search results to asset entitlements acquired from those specific secure domains. In addition, or alternatively, asset entitlement server 150 may be configured to filter the search result so as to omit asset entitlements for which the secure domain sending the entitlement inquiry lacks either the domain asset right or the domain entitlement right. Furthermore, in some embodiments, asset entitlement server 150 may be authorized and further configured to broker acquisition of the omitted asset entitlement or entitlements from the relevant asset owners on behalf of the secure domain.

Although the present discussion has thus far described asset entitlement database 156 containing entry 158 as residing in memory 154 of asset entitlement server 150, more generally, asset entitlement database 156 may be stored on any suitable computer-readable medium accessible to and searchable by asset entitlement server 150. The expression "computer-readable medium," as used in the present application, refers to any medium that provides instructions to a processor, such as processor 152 of asset entitlement server 150. Thus, a suitable computer-readable medium may correspond to various types of media, such as volatile media or non-volatile media, for example. Volatile media may include dynamic memory, such as dynamic random access memory (dynamic RAM), while non-volatile memory may include optical, magnetic, or electrostatic storage devices. Common forms of computer-readable media include, for example, a compact disc read-only memory (CD-ROM), DVD, or other optical disc; a RAM, programmable read-only memory (PROM), erasable PROM (EPROM), and FLASH memory.

With respect to the expression "domain transcendent user ID" invoked above, it is noted that, for the purposes of the present invention, that expression is used to signify an ID of user 102 that uniquely identifies user 102 across a plurality of domains, which in one embodiment, as shown in FIG. 1, comprise a plurality of secure domains. In one embodiment, a domain transcendent user ID of user 102, while uniquely identifying user 102 across secure domains 112*a* and 112*b*, for example, does not include personally identifiable information linked to user 102. It is further noted that, as used herein in the following discussion, the expression "domain specific user ID" refers to an ID generated by either of secure domains 112*a* and 112*b*, or any other secure domain not shown in FIG. 1, to identify and authenticate user 102 within that respective secure domain. As such, a domain specific user ID of user 102 may include personally identifiable information linked to user 102, and is typically not used or recognized outside of the secure domain in which it is generated.

However, ID associator application 128 can be executed by processor 122 of ID association server 120 so as to associate a domain transcendent user ID of user 102 with one or more domain specific user IDs that associate user 102 with either of respective secure domains 112*a* and 112*b*, for example. As a result, user 102 may enjoy a more seamless network experience by being relieved of the necessity of interacting with multiple log-in protocols and of entering multiple username and password combinations. For example, where user 102 has opted-in to association of his or her domain specific user IDs on both of secure domains 112*a* and 112*b* with a domain transcendent user ID of user 102 stored on ID association server 120, ID associator application 128 can be configured to facilitate network interactions of user 102 among a plurality of domains, such as secure domains 112*a* and 112*b*, while assuring that the personally identifiable information associated with the domain specific user IDs is not shared among the secure domains.

In addition, according to the present embodiment, information related to transactions between user 102 and either of secure domains 112*a* and 112*b*, and not including personally identifiable information, can be shared between secure domains 112*a* and 112*b*. For example, where secure domains 112*a* and 112*b* correspond to mutually independent providers of related goods and/or services, e-commerce transaction information, such as a history of product purchases, can be shared among the respective providers, thereby enabling them to be responsive to the preferences and known product acquisitions by user 102. Moreover, asset entitlements corresponding to the goods and/or services acquired by user 102 from either of secure domains 112*a* and 112*b* can be coordinated by asset entitlement server 150. Consequently, where secure domains 112*a* and 112*b* share the necessary domain asset and domain entitlement rights, for example, the asset entitlement coordination provided by asset entitlement server 150 enables user 102 to enjoy the coordinated asset entitlement using resources provided by either of secure domains 112*a* and 112*b*, regardless of which secure domain user 102 acquired the asset entitlement from originally. It is noted that although the embodiment of FIG. 1 shows two secure domains, e.g., secure domains 112*a* and 112*b*, the present inventive principles can be applied so as to coordinate asset entitlements among a plurality of secure domains numbering greater than two, such as tens, hundreds, or thousands of secure domains, for example.

It is further noted that asset entitlement server 150 is presumed to occupy a network interaction environment in which provisioning has been performed. That is to say, in order for asset entitlement server 150 to coordinate asset entitlements across a plurality of secure domains, as described by the present application, those secure domains must have previously been provisioned with the protocols for communicating with and selectively sharing information through asset entitlement server 150. For example, in order for secure domain 112*a* to obtain data from asset entitlement server 150 regarding asset entitlements acquired by user 102 from secure domain 112*b*, both of secure domains 112*a* and 112*b* must be configured to comply with the rules governing the coordination of asset entitlements by system 100.

In addition, where different secure domains utilize different codes to identify the same asset entitlement, e.g., where they use domain specific IDs for the same asset entitlement, asset entitlement server 150 can be configured to normalize or reconcile those distinct domain specific asset entitlement IDs so as to provide accurate data, as well as to aid in enabling interpretation of that data by the secure domain receiving it. For example, where secure domain 112*a* identifies the asset entitlement of rental rights to the Pirates of the Caribbean movie Curse of the Black Pearl as "AAA" and domain 112*b* identifies the same asset entitlement as "BBB", asset entitlement server 150 can be configured to receive an asset entitlement inquiry from secure domain 112*a* for asset entitlement "AAA," perform a search for "AAA" and "BBB" (assuming the plurality of secure domains is limited to secure domains 112*a* and 112*b*), and send data corresponding to the search to secure domain 112*a* in terms of the "AAA" identifier recognized by secure domain 112*a*.

Figure 2:
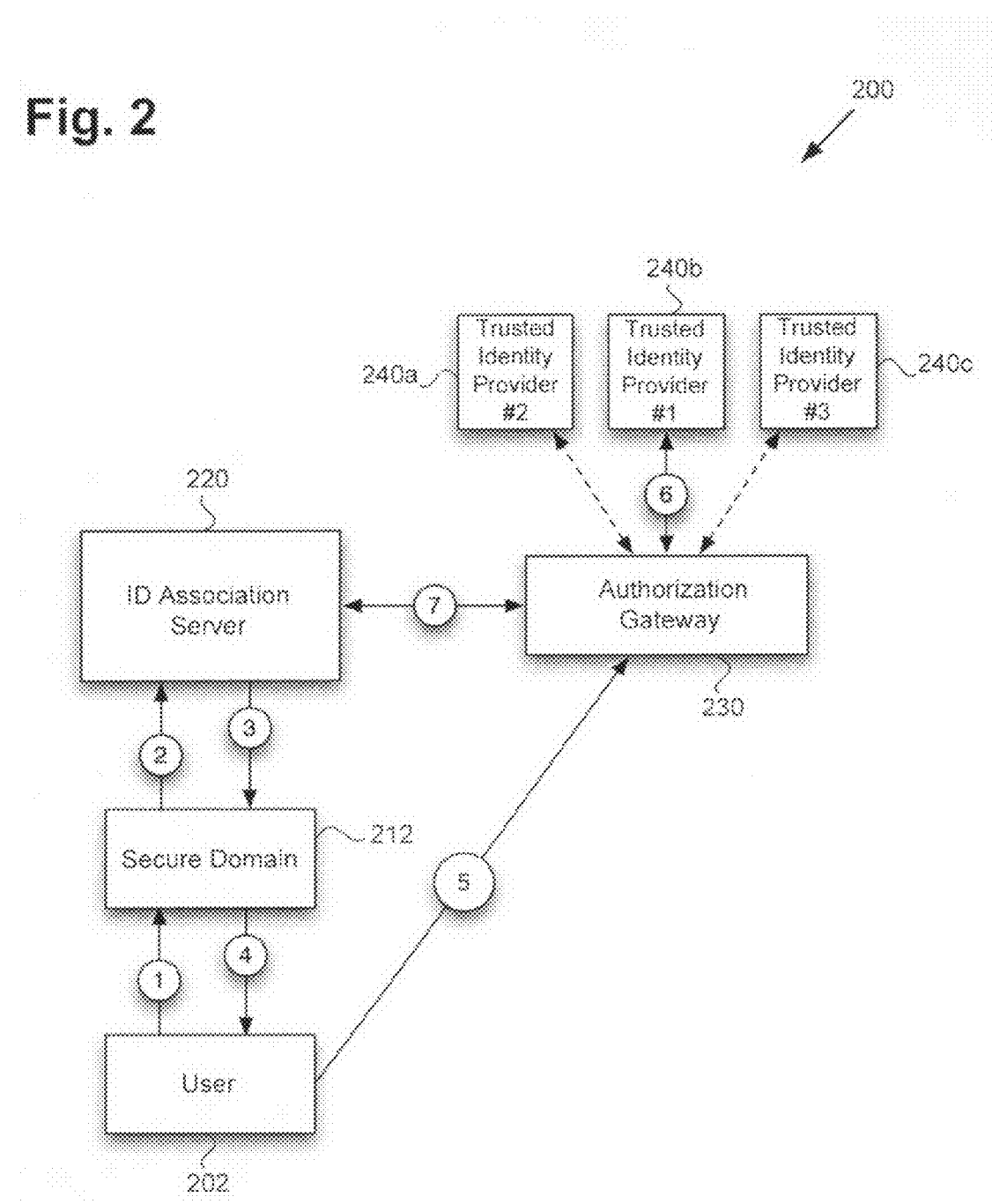
FIG. 2 shows a block diagram depicting a series of network interactions including participation by a system for associating a domain transcendent user identification (ID) of a user and at least one domain specific user ID of the user, capable of facilitating implementation of one embodiment of the present invention.

Before coordination of asset entitlements is described in greater detail by reference to FIG. 3, the process of associating a domain transcendent user ID with a domain specific user ID will be further described by reference to FIG. 2. FIG. 2 shows a block diagram depicting a series of network interactions including participation by a system for associating a domain transcendent user ID of a user and at least one domain specific user ID of the user, capable of facilitating implementation of one embodiment of the present invention.

FIG. 2 shows network interaction 200 in which user 202, secure domain 212, ID association server 220, authorization gateway 230 and at least one of trusted third-party identity providers 240*a*, 240*b*, and 240*c* participate. User 202 and ID association server 220 correspond respectively to user 102 and ID association server 120, in FIG. 1, and secure domain 212, in FIG. 2, corresponds to either of secure domains 112*a* or 112*b*, in FIG. 1. It is noted that, as was true for the embodiment in FIG. 1, although domain 212 is characterized as a secure domain in the present embodiment, that characterization is provided merely as an example. More generally, secure domain 212 may correspond to a secure domain or an unsecured domain, for example.

Network interaction 200, in FIG. 2, may be seen to correspond to a series of network communications, represented by communication links 1, 2, 3, 4, 5, 6, and 7 (hereinafter "communication links 1-7") in the present embodiment, in which ID association server 220 associates a domain transcendent user ID of user 202 with a domain specific user ID of user 202 that associates user 202 to secure domain 212. That association, performed using ID association server 220, may occur at the behest and on behalf of user 202, and corresponds, in FIG. 1, to user 102 utilizing client-side computer 104 to interact with one of secure domains 112a or 112b and ID association server 120, over network 110. Consequently, it may be understood that network interaction 200, represented in FIG. 2, may be repeated more than once so as to associate the domain transcendent user ID of user 202 with additional domain specific user IDs that associate user 202 to respective additional secure domains, such as secure domains 112a or 112b, in FIG. 1.

To provide an example context for the interaction represented in FIG. 2, user 202 may be seen to be a consumer seeking a commercial good or service, for example, an item of digital media content such as, an e-book or digital movie content, from a media content provider over the Internet. The media content provider or providers, for example, Amazon and Blockbuster online, establish respective secure domains, such as secure domains 112a and 112b, to authenticate recognized users of the respective secure domains, as well as to protect sensitive and/or personally identifiable information entered into the secure domains by the user during a registration process or in conjunction with a commercial, e.g., e-commerce transaction.

According to the present e-commerce example, user 202, acting as a potential consumer, accesses secure domain 212, which is a secure domain configured to utilize the domain transcendent user ID association service provided by ID association server 220, for example, by performing a log-in operation. Once logged-in to secure domain 212, user 202 may be invited to link the domain specific user ID associating him or her to the respective secure domain with a domain transcendent user ID, such as an ID of user 202 provided by one of trusted third-party identity providers 240a, 240b, or 240c, which may be an OpenID provider such as Google, Facebook, or VeriSign, for example. Such a decision by user 202 to opt-in to the service offered by ID association server 220 through secure domain 212 can be seen to correspond to communication link 1 linking user 202 and secure domain 212.

Having obtained the consent of user 202 to share domain specific user ID information with ID association server 220, secure domain 212 may then send the domain specific user ID that associates user 202 to secure domain 212, such as a consumer ID of user 202 on secure domain 212, to ID association server 220. In addition, secure domain 212 may also be expected to send provider information identifying the commercial entity corresponding to secure domain 212, e.g., Amazon or Blockbuster online identifying information. That communication of provider information and/or the domain specific user ID of user 202 by secure domain 212 corresponds to communication link 2 in FIG. 2.

Following receipt of the information corresponding to communication link 2, ID association server 220 may enter the domain specific user ID received from secure domain 212 in a domain transcendent ID record created for user 202 and stored in a memory of ID association server 220, such domain transcendent ID record 127 created for user 102 and stored in memory 124, in FIG. 1. ID association server 220 may be configured to then generate a unique data associated with the domain transcendent ID record, to identify a location of the network, e.g., network 110 in FIG. 1, for user 202 to submit the unique data, and then to send the unique data to user 202 via secure domain 212.

In one embodiment, for example, the unique data may comprise a token capable of being interpreted so as to identify the domain transcendent ID record and/or ID association server 220. For instance, a token can be created using a cryptographic hash function, such as Message-Digest algorithm 5 (MD5) or Secure Hash Algorithm 1 (SI-IA-1), for example, and applying the hash function to a unique data set. The unique data set may include the identity of the secure domain from which the domain specific ID was received in step 310, as well as data associated with the user, and other data, such as a time or date stamp, for example. The unique data set may then be hashed to generate the token.

A network location for submission of the unique data, e.g., token, by user 202 may comprise authorization gateway 230, and identifying the location of authorization gateway 230 may comprise identifying the Uniform Resource Locator (URL) at which authorization gateway 230 can be accessed on the network. In one embodiment, authorization gateway 230 may comprise an application programming interface (API) configured for use with Id associator application 128, in FIG. 1. Sending of the unique data, e.g., token, and the network location, e.g., URL of authorization gateway 230 may be seen to correspond to communication links 3 and 4, respectively linking ID association server 220 with secure domain 212 and secure domain 212 with user 202.

As explained above, communication link 4 can correspond to user 202 being provided with a network location, e.g., authorization gateway 230, to which to navigate in order to continue with the domain transcendent user ID association process. In that embodiment, communication link 5 may be seen to correspond to navigation by user 202 to authorization gateway 230, for example by means of client-side computer 104 and network 110, in FIG. 1. As further shown in FIG. 2, authorization gateway 230 may be configured to mediate authentication of user 202 by any one of multiple trusted third-party identity providers 240a, 240b, and 240c. The authentication data provided by the relevant one of trusted third-party identity providers 240a, 240b, and 240c includes the domain transcendent user ID of user 202, such as an OpenID generated by that respective trusted third-party identity provider, for instance.

For example, authorization gateway 230 may be configured to invite user 202 to select a trusted third-party identity provider from one or more eligible trusted third-party providers, such as trusted third-party identity providers 240a, 240b, and 240c. According to the embodiment shown in FIG. 2, user 202 selects trusted third-party identity provider 240b, and authorization gateway 230 mediates authentication of user 202 by trusted third-party identity provider 240b in a communication corresponding to communication link 6. In addition, authorization gateway 230 may be configured to query additional information from trusted third-party identity provider 240b as authorized by user 202, such as a verified email address and the username of user 202 associated with trusted third-party identity provider 240b, for example. The authentication data, including the additional information queried from trusted third-party identity provider 240b can be received by ID association server 220, as represented by communication link 7.

ID association server 220 can then associate the domain transcendent user ID and the domain specific user ID, such as by writing an entry into domain transcendent ID record 127 of database 126. That entry may record the association of the domain transcendent user ID of user 202 generated by trusted third-party identity provider 240b and the domain specific user ID, e.g., consumer ID, received from secure domain 212. Moreover, network interaction 200 may be repeated for additional domain specific user IDs that associate the user with respective additional secure domains.

For example, where a first network interaction including communication links 1-7 associates a domain transcendent user ID of user 102, in FIG. 1, with a user ID specific to secure domain 112a, a second iteration of that network interaction can be performed to associate the domain transcendent user ID with another user ID specific to secure domain 112b, and so forth. In addition, association of multiple domain specific user IDs of user 102 with a single domain transcendent user ID of user 102 also associates those domain specific user IDs with one another in domain transcendent ID record 127, thereby streamlining the network experience of user 102 by enabling use of a single domain transcendent user ID for authentication across a plurality of secure domains. In addition, ID association server 120 can communicate the domain transcendent user ID and associated domain specific user ID information for user 102 to asset entitlement server 150, where that domain transcendent user ID and associated information can be linked to asset entitlements acquired from an associated secure domain, such as secure domains 112a and 112b, and entered into asset entitlement database 156 as entry 158.

Referring now to FIG. 3, FIG. 3 is a flowchart presenting a method for coordinating asset entitlements across a plurality of secure domains, according to one embodiment of the present invention. The steps shown in flowchart 300 are provided merely as examples, however, so that a step may consist of one or more substeps or may involve specialized equipment or materials, as known in the art. While steps 310 through 370 indicated in flowchart 300 are sufficient to describe one embodiment of the present invention, other embodiments may utilize steps different from those shown in flowchart 300, or may include more, or fewer steps.

Beginning with step 310 in FIG. 3, step 310 of flowchart 300 comprises receiving an asset entitlement inquiry including a domain specific user identification (ID) of a user associated with a domain transcendent user ID of the user across a plurality of domains from one of the plurality of domains, which may be secure domains, for example. Referring to FIG. 1, step 310 may be performed by asset entitlement server 150 under the control of processor 152. Step 310 of flowchart 300 may be seen to correspond to an inquiry received from one of secure domains 112a and 112b over network 110, regarding asset entitlements acquired by user 102 across the plurality of secure domains including secure domains 112a and 112b. For example, the asset entitlement inquiry may originate from secure domain 112b and include the domain specific user ID of user 102; e.g., consumer ID, recognized by secure domain 112b. As described above with reference to the operation of ID association server 120, in one embodiment, a domain transcendent user ID of user 102 generated or provided by a trusted third-party identity provider may be associated with the domain specific user IDs, e.g., consumer IDs, of user 102 recognized respectively by secure domains 112a and 112b.

To provide an example context for the present method, user 102 may be seen to be a consumer having acquired asset entitlements associated with several units of digital media content, e.g., digital movies, from secure domains 112a and 112b. For the sake simplicity, let us assume that user 102 has acquired first and second asset entitlements from secure domain 112a, and a third asset entitlement from secure domain 112b. Let us further assume that secure domain 112b has domain asset rights and domain entitlement rights corresponding to the first asset entitlement, but lacks at least one of the domain asset right and the domain entitlement right corresponding to the second asset entitlement, both of which first and second asset entitlement were originally acquired from secure domain 112a.

Moreover, it should be understood that because secure domains 112a and 112b are designed to provide security for the sensitive financial or personally identifiable information provided by user 102 in the course of an e-commerce transaction, neither of secure domains 112a and 112b directly shares transaction information concerning user 102 with the other. As a result, secure domain 112a has transaction information regarding acquisition of the first asset entitlement and the second asset entitlement by user 102, but is typically unaware of the transaction through which user 102 has acquired the third asset entitlement from secure domain 112b. Analogously, secure domain 112b would typically be ignorant of acquisition by user 102 of the first and second asset entitlements from secure domain 112a. Thus, step 310 can correspond to receipt by asset entitlement server 150 of an inquiry from secure domain 112b regarding any asset entitlement acquisitions by user 102 across the plurality of secure domains including secure domain 112a and secure domain 112b.

Continuing with step 320 in FIG. 3, and continuing to refer as well to FIG. 1, step 320 of flowchart 300 comprises searching asset entitlement database 156, wherein entry 158 of asset entitlement database 156 links the domain transcendent user ID of user 102 and at least one asset entitlement acquired by user 102 from any of the plurality of domains including secure domains 112a and 112b. Step 320, like earlier step 310, may be performed by asset entitlement server 150 under the control of processor 152, for example. In one embodiment, step 320 may correspond to a direct search of entries in asset entitlement database 156 according to the domain transcendent user ID, so as to identify only those asset entitlements linked to the domain transcendent user ID of user 102 from the among the entries in asset entitlement database 156.

Moving on to step 330 in FIG. 3, step 330 of flowchart 300 comprises generating a search result identifying the asset entitlements acquired by user 102 from the plurality of domains including secure domains 112a and 112b. Once again, step 330 may be performed by asset entitlement server 150 under the control of processor 152. According to the specific example developed by reference to step 310 above, the search of step 320 would result in generation of a search result identifying the first and second asset entitlements, e.g., those acquired by user 102 from secure domain 112a, and the third asset entitlement, e.g., the one asset entitlement acquired by user 102 from secure domain 112b, from which the asset entitlement inquiry was received.

In some embodiments, a method for coordinating asset entitlements across a plurality of domains may include filtering the search result according to any of several filtering criteria. For example, asset entitlement server 150 may be configured to filter the search result by asset class, asset title, or asset feature, as described previously, so as to omit identification of asset entitlements not associated with the filtering criteria. In addition, or alternatively, asset entitlement server 150 may be configured to filter the search result in order to omit identification of an asset entitlement acquired by user 102 for which the inquiring domain, e.g., secure domain 112b, lacks at least one of a domain asset right and a domain entitlement right corresponding to the omitted asset entitlement. Such a filtering process is represented by step 340 of flowchart 300, and may be performed by asset entitlement server 150 controlled by processor 152. Consistent with the present example the filtering step of 340 would result in omission from the search result generated in step 330 of the second asset entitlement acquired from secure domain 112a, due to the lack of at least one of the domain asset right and the domain entitlement right corresponding to the second asset entitlement being held by secure domain 112b. In addition, or alternatively, in some embodiments, the asset entitlements acquired directly from the inquiring domain may be filtered and omitted, in which case the present search result would be further filtered to omit the third asset entitlement, acquired by user 102 from secure domain 112b.

Proceeding to step 350 in FIG. 3, step 350 of flowchart 300 comprises sending data corresponding to the search result to the domain from which the asset entitlement inquiry was received. Once again, step 350 may be performed by asset entitlement server 150 under the control of processor 152. According to the present exemplary method, step 350 corresponds to sending data by asset entitlement server 150 to secure domain 112b informing secure domain 112b of the acquisition of the first asset entitlement by user 102, but omitting information concerning acquisition of the second asset entitlement by user 102, for which secure domain 112b lacks at least one of the corresponding domain asset right and the corresponding domain entitlement right.

It is reiterated that although the present example characterizes domains 112a and 112b as secure domains, that characterization is not intended to be limiting. More generally, domains 112a and 112b may correspond to secure domains, unsecured domains, or a combination of both domain types. Moreover, and as further discussed above, in some embodiments of the present invention, domains 112a and 112b may comprise authorized domains, e.g., domains identified by system 100 as eligible to send an asset entitlement inquiry and to receive data corresponding to a search result in response. In those embodiments, when asset entitlement server 150 receives an asset entitlement inquiry from a domain that has not previously been authorized to make the inquiry and/or receive the data corresponding to the search result, e.g., not an authorized domain, asset entitlement server 150 may be further configured to send a message to the domain indicating that the received asset entitlement inquiry is invalid. In addition, in some embodiments, such an invalidity message may include information regarding the steps required of the inquiring domain in order for that domain to acquire authorized status. Alternatively, in some embodiments, asset entitlement server 150 may be configured to accept open asset entitlement inquiries and to provide the data corresponding to the search result to the querying domain without requiring that the domain have first acquired authorized status.

In some embodiments, the method of flowchart 300 may further comprise reconciling distinct domain specific IDs of an asset entitlement across the plurality of domains before sending the data corresponding to the search result in step 350, thereby enabling interpretation of the data by the domain from which the asset entitlement inquiry was received in step 310. As previously explained, where different domains utilize different and domain specific IDs for the same asset entitlement, asset entitlement server 150, in FIG. 1, can be configured to normalize or reconcile those distinct domain specific asset entitlement IDs so as to provide accurate search data, as well as to aid in enabling interpretation of that data by the domain receiving it.

Continuing to step 360 in FIG. 3, step 360 of flowchart 300 comprises offering to broker an acquisition of the domain asset right and/or the domain entitlement right corresponding to the omitted asset entitlement on behalf of the inquiring domain. Step 360 may be performed by asset entitlement server 150 under the control of processor 152, and corresponds to an offer to broker acquisition of the domain asset right and/or the domain entitlement right corresponding to the second asset entitlement on behalf of secure domain 112b. Referring to step 370 of FIG. 3, the present method may further comprise the step of brokering acquisition of the relevant domain asset right and/or the domain entitlement right corresponding to the second asset entitlement if secure domain 112b accepts the offer extended in step 360. For example, asset entitlement server 150 may be configured to mediate licensing of domain rights corresponding to a variety of asset entitlements from the asset entitlement owners or their authorized agents.

Thus, a system and method for coordinating asset entitlements has been described. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for coordinating asset entitlements across a plurality of domains, each of the domains configured to associate users with respective domain specific user identifications (IDs) unique to that domain, the system comprising:

a server including a processor and a memory, the server accessible by the plurality of domains over a network;

an asset entitlement database, wherein an entry of the asset entitlement database links a domain transcendent user ID of a user and at least one asset entitlement acquired by the user from any of the plurality of domains;

the server configured to:
receive an asset entitlement inquiry including a domain specific user ID of the user associated with the domain transcendent user ID from one of the plurality of domains;

receive a provider information, wherein the provider information identifies a commercial entity corresponding to the one of the plurality of domains;

search, using the domain transcendent user ID, the asset entitlement database for asset entitlements acquired by the user from the plurality of domains, the asset entitlements having been acquired by the user prior to receiving the asset entitlement inquiry by the server;

generate a search result identifying the asset entitlements acquired by the user from the plurality of domains;

filter the search result to omit one or more identified asset entitlements for which the one of the plurality of domains lacks at least one of a domain asset right and a domain entitlement right;

send the filtered search result to the one of the plurality of domains;

offer to broker an acquisition of the at least one of the domain asset right and the domain entitlement right corresponding to one or more of the omitted asset entitlements on behalf of the one of the plurality of domains; and broker the acquisition on behalf of the one of the plurality of domains if the one of the plurality of domains accepts the offer.

2. The system of claim 1, wherein the plurality of domains comprise secure domains.

3. The system of claim 1, wherein the one of the plurality of domains to which the filtered search result is sent comprises an authorized domain.

4. The system of claim 1, wherein the domain transcendent user ID comprises an ID generated by a trusted third-party identity provider.

5. The system of claim 1, wherein the server is further configured to identify the one of the plurality of domains as authorized to submit the asset entitlement inquiry before sending the filtered search result.

6. The system of claim 1, wherein the at least one asset entitlement acquired by the user corresponds to an asset selected from one of digital movie content, digital music content, and digital literary content.

7. The system of claim 1, wherein the asset entitlements comprise combinations of a user asset right and a user entitlement right, the user asset right comprising the right to enjoy an asset by the user and the user entitlement right defining conditions governing enjoyment of the asset by the user.

8. The system of claim 1, wherein the asset entitlements comprise combinations of a user asset right and a user entitlement right, the user asset right comprising the right to enjoy an asset by the user and the user entitlement right defining conditions governing enjoyment of the asset by the user, the conditions selected from one of licensing of the asset by the user, rental of the asset by the user, and subscription to the asset by the user.

9. The system of claim 1, wherein the domain asset right comprising the right to provide an asset by a domain and the domain entitlement right defining conditions governing provision of the asset by the domain.

10. The system of claim 1, wherein the domain asset right comprising the right to provide an asset by a domain and the domain entitlement right defining conditions governing provision of the asset by the domain, the conditions selected from one of sale of the asset by the domain, rental of the asset by the domain, and transmission of the asset by the domain over the network.

11. The system of claim 1, wherein the server is further configured to filter the search result according to an asset class specified in the asset entitlement inquiry to omit the one or more identified asset entitlements not included in the asset class.

12. The system of claim 1, wherein the server is further configured to filter the search result according to an asset title specified in the asset entitlement inquiry to omit the one or more identified asset entitlements not associated with the asset title.

13. The system of claim 1, wherein the server is further configured to filter the search result according to an asset feature specified in the asset entitlement inquiry to omit of the one or more identified asset entitlements not relating to the asset feature, wherein the asset feature is one of a theme characterizing the asset, a genre of the asset, and a performer corresponding to the asset.

14. The system of claim 1, wherein the server is further configured to reconcile distinct domain specific IDs of an asset entitlement across the plurality of domains before sending the filtered search result, thereby enabling interpretation of the filtered search result by the one of the plurality of domains.

15. A method for use by a system having a processor, accessible to a plurality of domains to coordinate asset entitlements across the plurality of domains, each of the domains configured to associate users with respective domain specific user identifications (IDs) unique to that domain, the method comprising:

receiving, by the processor, an asset entitlement inquiry including a domain specific user ID of a user associated with a domain transcendent user ID of the user across the plurality of domains from one of the plurality of domains;

receiving, by the processor, a provider information, wherein the provider information identifies a commercial entity corresponding to the one of the plurality of domains;

searching, using the domain transcendent user ID, by the processor, an asset entitlement database, wherein an entry of the asset entitlement database links the domain transcendent user ID and at least one asset entitlement acquired by the user from the plurality of domains, the asset entitlements having been acquired by the user prior to receiving the asset entitlement inquiry by the processor;

generating, by the processor, a search result identifying the asset entitlements acquired by the user from the plurality of domains;

filtering, by the processor, the search result to omit one or more identified asset entitlements for which the one of the plurality of domains lacks at least one of a domain asset right and a domain entitlement right;

sending, by the processor, the filtered search result to the one of the plurality of domains;

offering, by the processor, to broker an acquisition of the at least one of the domain asset right and the domain entitlement right corresponding to one or more of the omitted asset entitlements on behalf of the one of the plurality of domains; and brokering, by the processor, the acquisition on behalf of the one of the plurality of domains if the one of the plurality of domains accepts the offer.

16. The method of claim 15, wherein the plurality of domains comprise secure domains.

17. The method of claim 15, wherein the one of the plurality of domains to which the filtered search result is sent comprises an authorized domain.

18. The method of claim 15, wherein the domain transcendent user ID comprises an ID generated by a trusted third-party identity provider.

19. The method of claim 15, further comprising identifying the one of the plurality of domains as authorized to submit the asset entitlement inquiry before sending the filtered search result.

20. The method of claim 15, wherein the at least one asset entitlement acquired by the user corresponds to an asset selected from one of digital movie content, digital music content, and digital literary content.

21. The method of claim 15, wherein the asset entitlements comprise combinations of a user asset right and a user entitlement right, the user asset right comprising the right to enjoy an asset by the user and the user entitlement right defining conditions governing enjoyment of the asset by the user.

22. The method of claim 15, wherein the asset entitlements comprise combinations of a user asset right and a user entitlement right, the user asset right comprising the right to enjoy an asset by the user and the user entitlement right defining conditions governing enjoyment of the asset by the user, the conditions selected from one of licensing of the asset by the user, rental of the asset by the user, and subscription to the asset by the user.

23. The method of claim 15, wherein the domain asset right comprising the right to provide an asset by a domain and the domain entitlement right defining conditions governing provision of the asset by the domain.

24. The method of claim 15, wherein the domain asset right comprising the right to provide an asset by a domain and the domain entitlement right defining conditions governing provision of the asset by the domain, the conditions selected from one of sale of the asset by the domain, rental of the asset by the domain, and transmission of the asset by the domain over a network.

25. The method of claim 15, further comprising filtering the search result according to an asset class specified in the asset entitlement inquiry to omit the one or more identified asset entitlements not included in the asset class.

26. The method of claim 15, further comprising filtering the search result according to an asset title specified in the asset entitlement inquiry to omit the one or more identified asset entitlements not associated with the asset title.

27. The method of claim 15, further comprising filtering the search result according to an asset feature specified in the asset entitlement inquiry to omit the one or more identified asset entitlements not relating to the asset feature, wherein the asset feature is one of a theme characterizing the asset, a genre of the asset, and a performer corresponding to the asset.

28. The method of claim 15, further comprising reconciling distinct domain specific IDs of an asset entitlement across the plurality of domains before sending the filtered search result, thereby enabling interpretation of the filtered search result by the one of the plurality of domains.

* * * * *